United States Patent
Snoussi et al.

(10) Patent No.: US 9,285,456 B2
(45) Date of Patent: Mar. 15, 2016

(54) SYSTEM AND METHOD FOR LOCATING A TARGET USING A TRANSCEIVER ARRAY

(75) Inventors: Hichem Snoussi, St Andre les Vergers (FR); Cédric Richard, Nice (FR); Paul Honeine, Troyes (FR)

(73) Assignee: UNIVERSITE DE TECHNOLOGIE DE TROYES, Troyes (FR)

( * ) Notice: Subject to any disclaimer, the term of this patent is extended or adjusted under 35 U.S.C. 154(b) by 1115 days.

(21) Appl. No.: 13/264,719

(22) PCT Filed: Apr. 19, 2010

(86) PCT No.: PCT/FR2010/050750
§ 371 (c)(1),
(2), (4) Date: Mar. 5, 2012

(87) PCT Pub. No.: WO2010/119230
PCT Pub. Date: Oct. 21, 2010

(65) Prior Publication Data
US 2012/0154219 A1   Jun. 21, 2012

(30) Foreign Application Priority Data
Apr. 17, 2009   (FR) ..................... 09 01879

(51) Int. Cl.
*G01S 5/02*   (2010.01)
(52) U.S. Cl.
CPC ............ *G01S 5/0289* (2013.01); *G01S 5/0252* (2013.01); *G01S 5/0294* (2013.01)
(58) Field of Classification Search
USPC ............... 342/451, 458, 463–465; 455/456.1
See application file for complete search history.

(56) References Cited

U.S. PATENT DOCUMENTS

| 5,289,189 | A  * | 2/1994  | Colegrove ...................... 342/95 |
| 7,233,286 | B2 * | 6/2007  | Krumm et al. ................ 342/451 |
| 8,213,956 | B2 * | 7/2012  | Sirola et al. ................ 455/456.1 |
| 2005/0055417 | A1 * | 3/2005  | Reich et al. .................... 709/208 |
| 2005/0136845 | A1 * | 6/2005  | Masuoka et al. ........... 455/67.14 |
| 2008/0268873 | A1 * | 10/2008 | Wymeersch et al. ...... 455/456.6 |
| 2009/0286549 | A1 * | 11/2009 | Canon et al. ............... 455/456.1 |

OTHER PUBLICATIONS

Teng, Variational Filtering Algorithm for Interdependent Target Tracking and Sensor Localization in Wireless Sensor Network, Aug. 25-29, 2008 Eusipco 08.*
Snoussi, Ensemble Learning Online Filtering in Wireless Sensor Networks, 2006, IEEE.*

(Continued)

*Primary Examiner* — Dao Phan
(74) *Attorney, Agent, or Firm* — Hauptman Ham, LLP

(57) ABSTRACT

The invention relates to a system and a method for locating at least one target (X) using an array of transceivers or sensors (S), in which at least a portion has a known geographic location, each comprising data processing means (S1) implementing at least one algorithm (AA, AS, AR, AF) for locating a target, means (S2) for transmitting/receiving a signal that decreases with the distance, the sensor array (S) covering at least one geographic area or area (Z), characterized in that they implement for each instant (t) an exchange of data or similarity data (DS) between the sensors (S) and a leading sensor (SL), and a distribution determination (DP) of the probability of the location of the target (X) using at least one regression algorithm (AR) on the basis of the similarity data (DS).

15 Claims, 4 Drawing Sheets

(56) References Cited

OTHER PUBLICATIONS

Xuanlong Nguyen et al.: "A Kernal-Based Learning Approach to Ad Hoc Sensor Network Localization," ACM Transactions on Sensor Networks, vol. 1, No. 1, Aug. 1, 2005, pp. 134-152, XP007910769, ISSN: 1550-4859.

Jing Teng et al.: "Binary Variational Filtering for Target Tracking in Sensor Networks," Statistical Signal Processing, 2007, SSP '07, IEEE/SP $14^{th}$ Workshop on, III, PI, Aug. 1, 2007, pp. 685-689, XP031134157, ISBN: 978-1-4244-1197-9.

Jing Teng et al.: "Prediction-Based Proactive Cluster Target Tracking Protocol for Binary Sensor Networks," Signal Processing and Information Technology, 2007 IEEE International Symposium on, IEEE, Piscataway, NJ, USA, Dec. 15, 2007, pp. 234-239, XP031234282, ISBN: 978-1-4244-1834-3.

Paul Honeine et al.: "Localization in sensor networks—A matrix regression approach," Sensor Array and Multichannel Signal Processing Workshop, 2008, SAM 2008, 5 IEEE, IEEE, Piscataway, NJ, USA, Jul. 21, 2008, pp. 284-287, XP031312335, ISBN: 978-1-4244-2240-1.

Xuanlong Nguyen et al.: "A Kernel-Based Learning Approach to Ad Hoc Sensor Network Localization," ACM Transactions on Sensor Networks, vol. 1, No. 1, Aug. 1, 2005, pp. 134-152, XP007910769, ISSN: 1550-4859.

Jing Teng et al.: "Binary Variational Filtering for Target Tracking in Sensor Networks," Statistical Signal Processing, 2007, SSP '07, IEEE/SP 14th Workshop on, III, PI, Aug. 1, 2007, pp. 685-689, XP031134157, ISBN: 978-1-4244-1197-9.

International Search Report for PCT/FR2010/050750 mailed Sep. 13, 2010.

* cited by examiner

SYSTEM AND METHOD FOR LOCATING A TARGET USING A TRANSCEIVER ARRAY

BACKGROUND

The present invention relates to the field of electronics, particularly to networks of transmitter/receivers, and in particular the field of location and/or tracking of targets by a network of transmitter/receivers. The present invention relates more particularly to a system and a method for locating a target with a network of transmitter/receivers and also relates to location over time, that is to tracking a target with a network of transmitter/receivers.

FIELD

The transmitter/receiver devices of the present invention, hereafter called "sensors," relate in fact to any type of device emitting a signal which decreases with distance and capable of measuring a return signal to allow location of a target (an object or a person, by way of non-limiting examples) or even a mobile sensor of the same type. These sensors can in fact consist of devices using a radio-frequency signal, a sonic signal, etc. By way of an illustrative and non-limiting example, these devices can be mobile telephones or radio transmitter/receivers, the essential condition being that they emit and receive a signal allowing geographic location due to the fact that power decreases with distance. In certain cases, and particularly in the case of mobile telephones, the target to be located can itself be a sensor (a mobile telephone for example), the other sensors possibly being devices of identical or different types (mobile network transmitter/receivers, for example) but using the same type of signal. Thus, the sensors implementing the invention include means of performing a measurement, means of processing that measurement and means of broadcasting information relating to this processing of the measurement to one another and/or to a higher-level system or to a human.

It is known in prior art to determine the location of a target based on a signal received by a transmitter/receiver (or "sensor" as defined here), but this requires knowing or assuming a model of signal attenuation as a function of distance. One problem in the fields of location by such sensors therefore relates to the knowledge or assumption regarding this attenuation model. Indeed, most methods of location and tracking rely on a state model made up of two equations: an equation of state reflecting the a priori dynamics of the object to be located and an observation equation relating the observed data with the state of the system which it is desired to estimate. The known solutions use a function relating the position of the target to the observation of the sensor, which models the operation of the sensor. This function is assumed to be generally known in methods of location and tracking. However, it can be noted that in practice, the function may not be perfectly known. In addition, this function, even when it is valid, has parameters that vary according to the geographic spot where the sensors are situated. Location methods are known for example that use radio sensors employing an RSSI (Received Signal Strength Indicator) power model exchanged between 2 sensors according to their distance. Tests reveal the inaccuracy of this model. Moreover, a simple rotation of the sensors can completely alter the parameters of the RSSI curve. The known solutions therefore have the disadvantages of requiring a model of power attenuation as a function of distance and being unreliable due to possible variations of the sensors' environment or variations in the sensors themselves (aging or deterioration).

Another problem in the field of target tracking relates to the estimation of the trajectory of the target and the type of target involved. The tracking of one or more passive targets can be carried out thanks to the deployment of a network of geographically distributed sensors, allowing the detection and tracking of one or more targets passing through the monitored region. While limited in power, in perimeter of observation and in stored energy, the sensors must cooperate to ensure effective estimation of the positions for mobile targets. In general, the measurements collected by the sensors are contaminated with errors and the dynamic models of target motion are nonlinear. For these reasons, approximate statistical inference methods are generally employed in a distributed and cooperative fashion. Moreover, in the case of location of one or more sensors not equipped with a geolocation system, knowledge of the positions of the sensors is paramount for many applications of the sensor networks. In particular, tracking of targets by a network of collaborating sensors relies essentially on knowledge of the positions of the sensors. A first solution consists of equipping all the sensors with positioning systems or GPS (Global Positioning System). However, this method has proven to be too expensive due to the excessive power consumption of GPS sets. A more effective alternate solution consists of equipping only a small number of sensors, called anchors, with GPS. The other sensors, called nodes, exchange information with the anchors. This alternative approach (auto-location) has proven particularly attractive due to its flexibility and is consequently the subject of much active research. The estimation of the positions of the sensors in an autonomous and collaborative network thus represents an important preliminary step. Its quality is paramount because it conditions the performance of the system in its decision-making. These two problems of locating passive targets or non-geolocated sensors are very similar and the solution proposed by the present invention applies to both cases. In fact, the two problems relate to the location of a mobile object (passive target or mobile sensor) on the basis of a prior motion model and of data reflecting the proximity of the anchor sensor to the object to be located. The case of a single passive target to be located is equivalent to the case of a single mobile sensor to be located. The two problems are slightly differentiated in the case where several objects are to be located: the mobile nodes can additionally measure mutual proximity data while the passive targets cannot.

The problems of tracking a mobile object (passive target or active sensor) are generally resolved in a Bayesian framework on the basis of a state model. The state model contains two equations: one equation reflecting the a priori information that is at hand regarding the trajectory of the target and a second equation relating the unknown state of the system to the observations available to the sensors carrying out the tracking. Bayesian filtering method consists of estimating the a posteriori distribution of the system state (position of the target) knowing all the observations of the sensors that have detected the target. Within the scope of the present invention, preferred consideration is given to distributed filtering (without a central hierarchy) where only a few sensors considered relevant are activated to ensure effective tracking.

Considering the nonlinearity of the observation equations, generally known as the observation model, Bayesian filtering method is implemented in the solutions known from the prior art by a sequential Monte Carlo method (particle filtering). The popularity of this type of method is essentially due to their flexibility in processing nonlinear/non-Gaussian dynamic models and also nonlinear/non-Gaussian confidence functions, generally known as likelihood model. However, particle filtering requires the exchange of a large number of particles (randomly simulated positions) when the sensors carrying out tracking hand over to other more relevant sensors in the following instant. For this reason, approximations have been considered to accommodate energy constraints. For example, solutions are known that use an approximation of the particle distribution, known by the type name of "KD-tree." Also known are solutions using a collaborative strategy based on a Gaussian mixture type of approximation and implemented by an EM (Expectation Maximization) algorithm. Unlike the KD-tree approximation, the Gaussian mixture approximation does not allow monitoring of the propagation of the approximation error.

The KD-tree approach makes it possible to make a compromise between the approximation error and digital communication constraints. However, the two approach result in the propagation of successive approximation errors.

In addition, the principal flaw in all the tracking approaches presented above is the fact that they do not consider a much more important factor in wireless sensor networks: the modality of observation. The following points must be taken into account:

1. For reasons of cost, the sensors are not generally equipped with sophisticated capture systems.

2. The actual operating conditions of the sensors are generally not known. It follows that the observation function is not known and changes with the environment of the sensor.

3. Sensors can deteriorate over time (normal wear or incidents).

By way of example, the proximity model that is much used in the literature is that of RSSI (Received Signal Strength Indicator). RSSI is based on a parametric model the parameters whereof must be learned according to the environment of the sensor. The tracking and location performance are very sensitive to the relevance of this model and of its set parameters. In fact, RSSI represents the form of the confidence function that is used in Bayesian filtering. The deviation of this confidence function causes severe degradation in the tracking performance. One way of avoiding this problem is the use of binary sensors based on the comparison of RSSI with a threshold set for deciding whether or not the target is in the vicinity of the sensor. The principal flaw in this approach is the loss of a large quantity of information in thresholding the RSSI (hard decision).

In this context, it is therefore of interest to propose a solution making it possible to palliate at least some of the disadvantages of the prior art methods and systems, which necessitate an operating model of the sensors and/or necessitate calculations of a plurality of particles for filtering and/or bring about the propagation of approximation errors and/or are not resistant to changes in the sensors or in their environment.

BRIEF SUMMARY

The present invention has as its object to propose a method for locating a target with a network of sensors that allows mitigation of at least some drawbacks of the prior art.

This goal is attained by a method of location and/or tracking of at least one target by a network of transmitter/receivers, called sensors, at least part of which has a known geographic location, each comprising data processing means implementing at least one algorithm for locating and/or tracking a target or targets, means for transmitting/receiving a signal that decreases with distance and communication means, the network of sensors covering at least one geographic area, called a region, characterized in that it comprises, for each instant, an iteration of the following steps:

selection of a sensor, called the leader, for each target, using at least one leader selection algorithm, for the implementation of the subsequent steps, exchange of data, called similarity data, between the leader sensor and at least a part of the sensors in the network, these data being representative of the power measurements of the signal between the sensors and the target and between the sensors themselves, determination of a probability distribution of the position of the target within the region, by the leader sensor, using at least one probabilistic matrix regression algorithm on the basis of the similarity data.

According to another special feature, the method comprises, when the target(s) is(are) a passive target or targets with respect to the sensors' signals, a step consisting of detection of at least one target present in the region, by at least one of the sensors, at an initial instant, and comprises, at each instant, an iteration of a step consisting of selecting a set of n sensors, using at least one activation algorithm, prior to the step of selecting a leader sensor, the latter being then selected from within that set using a selection algorithm.

According to another special feature, when the target(s) is (or are) a mobile sensor or sensors, it (they) is (are) selected, using the selection algorithm, as the leader sensor or sensors and select(s), using at least one activation algorithm, a set of n neighboring sensors for estimating the position of the target in the region.

According to another special feature, the method comprises, at every instant, an iteration of a step consisting of tracking of the target by the leader sensor, by updating the position of the target using at least one variational filtering algorithm based on a variational filter providing an estimate of the position of the target.

According to another special feature, the variational filter used during the updating step relies on the use of a confidence function of the position of the target based on the probability distribution of the position of the target, determined during the determination step and on the use of a model, called a transition model, based in particular on a temporal correlation of an assumed trajectory of the target from one instant to another.

According to another special feature, when there exist several targets and they are passive, the leader sensor of each of the targets implements, during the updating step, a step of probabilistic association of the data representing the position of the target and its trajectory, emanating from the variation filter used by that leader sensor, for determining which target corresponds to which set of data.

According to another special feature, the tracking step comprises, at each instant, an iteration of a step consisting of predicting the position(s) of the target(s) at the following instant.

According to another special feature, the step of predicting the position(s) of the target(s) at the following instant is accompanied, when the target(s) is(are) a passive target or targets with respect to the sensors' signals, by a reiteration of the step of selecting a set of n sensors using at least one activation algorithm and of the step of selecting a leader sensor using the selection algorithm.

According to another special feature, the step of predicting the position(s) of the target(s) at the following instant is followed, when the target(s) is (are) a passive target or targets with respect to the sensors' signals, by a step consisting of sending, by the leader sensor in that instant to the leader sensor of the following instant, of data representative of the sufficient statistics for updating the variational filter in the following instant and for a reiteration of the method.

According to another special feature, the step of predicting the position(s) of the target(s) at the following instant is followed, when the target(s) is (are) a mobile sensor or sensors, by a stop consisting of erasing the data processed by the processing means of the leader sensor, with the exception of the data representative of the sufficient statistics for updating the variational filter of that leader sensor in the following instant, followed by a reiteration of the method.

According to another special feature, the similarity data are considered to be Euclidean scalar products between the sensors and the target and between the sensors themselves, in a reproducing kernel Hilbert space.

According to another special feature, the probability distribution of the position of the target in the region is a Gaussian.

According to another special feature, the data representative of sufficient statistics are representative of a mean and a covariance of the estimated position of the target.

The present invention also has the object of proposing a system for locating a target with a network of sensors allowing mitigation of at least some drawbacks of the prior art.

This object is attained by a system for locating and/or tracking at least one target using a network of transmitter/receivers, called sensors, at least part of which has a known geographic location, each comprising data processing means, means for transmitting/receiving a signal that decreases with distance and communication means, the network of sensors covering at least one geographic area, called the region, characterized in that the data processing means implement at least one algorithm for locating and/or tracing a target or targets by the implementation of a method according to the invention.

According to another special feature, the means for transmitting/receiving a signal that decreases with distance and the communication means are the same means, allowing both measurements and communication for the implementation of the method.

DESCRIPTION OF THE DRAWINGS

Other special features and advantages of the present invention will appear more clearly upon reading the description given hereafter, made with reference to the appended drawings, in which.

DETAILED DESCRIPTION

Figure 1:
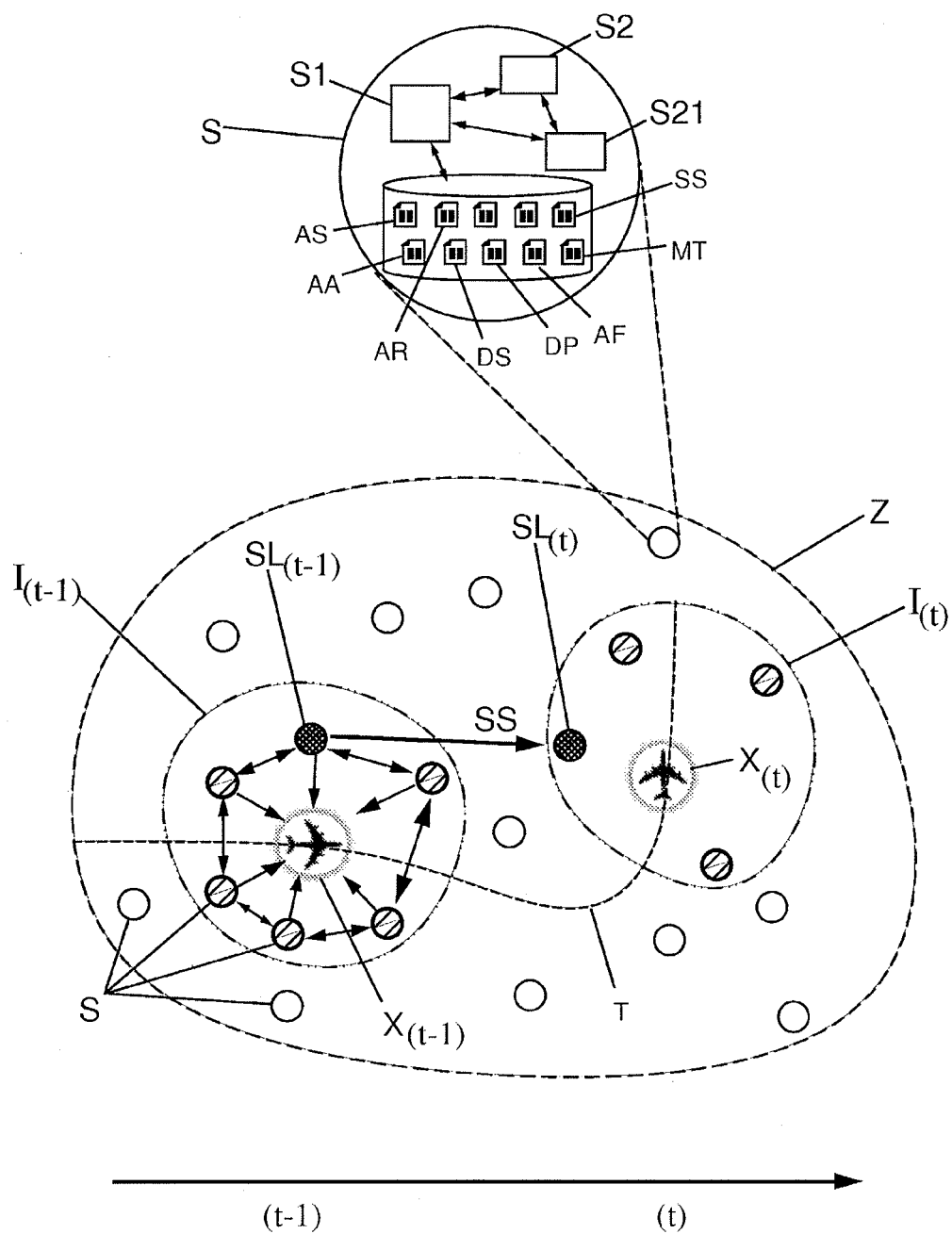
FIG. 1 shows an embodiment of the location system according to the invention following a passive target over time, with a magnification of a sensor in the network.

The present invention relates to a system and a process for locating and/or tracking targets with a network of sensors which does not require an operating model for the sensors (or "observation model").

The transmitting/receiving devices of the present invention, hereafter called "sensors," relate in fact to any type of device emitting a signal that decreases with distance. These sensors are capable of measuring a return signal to allow location of a target (an object or a person, by way of non-limiting examples), or even a mobile sensor of the same type. The target(s) to be located can be passive or be a mobile sensor or sensors. A target is said to be passive with respect to the sensors' signal when it does not transmit this type of signal. Its location is then made possible only by the return to the sensors of the signal that encountered the target. In the case of a passive target, it is only the return signal received by the transmitter/receivers that will allow location of the target. In the case of a mobile sensor, which can be taken as a target, it captures (receives) and sends (transmits) a signal of the same type as the sensors in the location network and therefore also plays the role of a sensor in the network, but in a privileged fashion as detailed hereafter. The sensors perceive the signal transmitted by the other sensors (the signal's strength in particular) and it is possible to take advantage of this special feature as explained hereafter.

The sensors can in fact consist of devices using a radio-frequency signal, a sonic signal, etc. By way of an illustrative and non-limiting example, these devices can be mobile telephones or radio transmitter/receivers, the essential matter being that they transmit and receive a signal allowing geographical location thanks to the fact that the power of the signal decreases with distance. In certain cases, and particularly in the case of mobile telephones, the target to be located can itself be a sensor (a mobile telephone for example), the other sensors possibly being devices of identical or different type (mobile network transmitter/receivers for example) but using the same type of signal. The present invention uses a network of sensors mutually connected thanks to communication means. These communication means can, depending on the case, transmit a signal for communication which can be of a type different from or identical to the type of signal used for location (for example the location of a mobile telephone by transmitter/receivers in the network can be performed by the use of radio communication signals used for mobile communications and it is therefore the same signal that allows location and communication between transmitter/receivers in the network). Thus, the means of transmitting/receiving a signal that decreases with distance and the means of communication can, in certain embodiments, be the same means allowing both measurements and communication for the implementation of the invention.

The present invention is implemented by a network of "sensors" which will be considered hereafter to each include data processing means for implementing algorithms relating to the calculations described in the present application (possibly with memory means storing those algorithms), means of transmitting/receiving a signal that decreases with distance and possibly communication means (if they are unable to communicate using the signal transmitting/receiving means). The communication means can be wired or wireless means. Preferably, the invention will be implemented in a network of autonomous sensors (i.e. not requiring a higher level system) which implement the invention in a collaborative manner. The processing means can be reconfigurable according to change in the sensor population. These distributed modes have the advantage of being particularly resistant to outside attacks and to sensor failures because it is so designed that the loss of components does not compromise the effectiveness of the network as a whole. The formulation of the decision problems and the resolution algorithms is completely altered because each "node" of the network, consisting of an intelligent miniaturized sensor (possibly having a limited store of energy), is assigned the task of carrying out measurements and making partial local decisions. The latter are gradually refined, step by step, by the sensors around it. At least part of the sensors in the network have a geographic location that is known. The sensors with known positions can, in the following description, be designated by the term "anchors" widely used in this field, whether or not they are in fact mobile. The sensors with unknown positions can, in the description hereafter, be designated by the term "nodes" widely used in this field.

The present invention therefore relates to a system for locating and/or tracking at least one target (X) with a network of transmitter/receivers, called sensors (S). The system therefore comprises a plurality of sensors of which at least part have a known geographic location. Each of the sensors (S) comprises data processing means (S1), means (S2) for transmitting/receiving a signal that decreases with distance and communication means (S21). This network of sensors (S) covers at least one geographic area called the region (Z). The system is characterized in that the data processing means (S1) implement at least one algorithm (AA, AS, AR, AF) for locating and/or tracking targets through the implementation of the invention as detailed hereafter. These algorithms are detailed with reference to a method according to the invention and the person skilled in the art will understand upon reading the present application how to implement these algorithms in the sensors. In certain embodiments, the means (S2) for transmitting/receiving a signal that decreases with distance and the communication means (S21) are the same means, allowing both measurement and communication for the implementation of the invention.

The present invention also relates to a method of locating and/or tracking at least one target (X) with a network of transmitter/receivers, called sensors (S), at least part of which have a known geographic location. Each of the sensors comprises data processing means (S1) implementing at least one algorithm (AA, AS, AR, AF) for locating a target or targets, means (S2) for transmitting/receiving a signal that decreases with distance and possibly communication means (S21). The network of sensors (S) covers at least one geographical area, called the region (Z). The method is characterized in that it comprises, for each instant (t), one iteration of the following steps:
- selection (52) of a sensor, called the leader (SL), for each target (X), using at least one leader selection algorithm (AS), for implementing the subsequent steps,
- exchange (53) of data, called similarity data (DS) between at least part of the sensors (S) and the leader sensor (SL), these data being representative of the measurements of the power of the signal between the sensors (S) and the target (X) and between the sensors themselves,
- determination (54) of a probability distribution (DP) of the position of the target (X) within the region (Z) by the leader sensor (SL), using at least one probabilistic matrix regression algorithm (AR) on the basis of the similarity data (DS).

During the step (53) of exchanging similarity data, the data can be representative of power measurements of the signal between the sensors (S) and the target (X) and between the sensors themselves, the essential matter being it is the measurements between the sensors themselves that make it possible to dispense with an operational model of the sensors (data on power decreasing as a function of distance). The term "similarity" is used here to designate the fact that when two objects approach one another, the signal becomes greater. There is therefore similarity in the signal's change. Mathematically, the similarity data (DS) can be considered as the scalar products of the two objects, that is the scalar Euclidean products between the sensors and the target and between the sensors themselves within a reproducing kernel Hilbert space.

FIG. 1 shows an embodiment of the system according to the invention covering a region (Z) with a magnification of a sensor (S) in the network detailing the means which it comprises, in the case of a passive target with trajectory (T). This figure illustrates the selection of sets ($I_{(t-1)}$ and $I_{(t)}$ respectively) of sensors from the previous instant (t−1) to the instant (t) (or from a given instant to the following one) and the changing of the leader sensor (SL) between the 2 instants, with transmission of the data (SS) representative of the sufficient statistics between the leader sensor ($SL_{(t-1)}$ at a previous instant (t−1) and the leader sensor ($SL_{(t)}$) at the instant (t).

The invention is implemented differently depending on whether the target is a passive target or a mobile sensor, as detailed hereafter. In both cases, the invention uses at least one selected sensor as the leader and cooperating with at least a part of the other sensors in the network. For example, the method comprises a step of selecting (51) a set (I) of n sensors (S) which will implement certain steps of the method. When the target(s) (X) is (are) a mobile sensor or sensors, it (they) is (are) selected, thanks to the selection algorithm (AS), as leader sensor(s) (SL) during the step (52) of selecting the leader sensor(s). The mobile sensor selects itself as leader sensor for estimating its own position. The method will then start, for example, provided that this mobile sensor detects the signal of an anchor sensor (with a known position) in its environment. The step of selecting (51) the set (I) is then implemented by this mobile leader sensor which selects, thanks to at least one activation algorithm (AA), a set (I) of n neighboring sensors (S) to estimate the position of the target (X) in the region (Z), that is its own position. This selection can be defined in the activation algorithm (AA) as a selection of all the sensors whose signal it is capturing or of the sensors whose signal exceeds a threshold or any type of algorithm of this type that allows good selectivity and good specificity of the selection (51) of the set (I).

However, when the target(s) (X) is (are) a passive target or targets with respect to the signal of the sensors (S), the method includes a step of detecting (50) at least one target (X) present in the region (Z) by at least one of the sensors (S) at an initial instant. The method then comprises, at each instant (t), one iteration of a step consisting of selecting (51) a set (I) of n sensors (S), using at least one activation algorithm (AA), prior to the step of selecting (52) the leader sensor (SL), the latter being then selected from among this set (I) thanks to the selection algorithm (AS). In this case, the activation algorithm can for example in the case of a so-called "clusterized" network, where a "head" of the cluster performs the processing and distributes the information among the surrounding sensors, define an activation protocol according to which the prediction of the position of the target based on the variational filter detailed hereafter allows the closest cluster to be selected. In the case of a non-clusterized network, the activation algorithm (AA) can for example define an activation protocol according to which the prediction of the position of the target based on the variational filter detailed hereafter allows selection of the sensors whose barycenter is the closes to the predicted position. In any case, the algorithm can also define the number n of sensors (S) that the set (I) must comprise.

Construction of the Confidence Function by Matrix Regression

The steps of exchanging (53) similarity data and of determination (54) make it possible to dispense with the necessity of an operational model of the sensors and correspond to a local construction of a linear and Gaussian confidence model by using the data measured between the sensors having known positions thanks to a probabilistic matrix regression algorithm (AR) on the basis of the similarity data (DS). In order to establish a link with the problem of matrix regression, the observed data are considered to be similarity data between the sensor and the target. The sole initial assumption on the nature of the observations is the fact that the similarity data measured between the sensors and the targets or between the sensors themselves is a strictly decreasing function of distance. No model is assumed to be known.

At every instant t, it is assumed that a set (I) of n sensors $(s_1^{(t)}, \ldots, s_n^{(t)})$ is selected for estimating the position $x_t$ of the target (X). It is also assumed that the similarity data measured between the sensors and the target and between the sensors themselves are available at the leader sensor (SL) (in particular, a sensor selected for updating the filtering process described hereafter). The inter-sensor similarity data play the role of training data which will be used without knowledge of the model which relates them to the distances. The similarity data are considered to be scalar products in the reproducing Kernel Hilbert space (RKHS). In other words, the measure of similarity between one sensor $s_i^{(t)}$ and another sensor $s_j^{(t)}$ is considered to be the Euclidean scalar product between their representatives $\phi(s_i^{(t)})$ and $\phi(s_j^{(t)})$ in the RKHS: $\kappa(s_i^{(t)}, s_j^{(t)}) = \langle \phi(s_i^{(t)}), \phi(s_j^{(t)}) \rangle$ According to this formulation, the (N×N) matrix (with N=n+1) of the similarity data corresponds to the kernel matrix K (measured and therefore completely known) whose elements are defined as follows:

$$\begin{cases} (K)_{i,j} = \kappa(s_i^{(t)}, s_j^{(t)}) & 1 \le i \ne j \le n, \\ (K)_{i,n+1} = \kappa(s_i^{(t)}, x_t) & 1 \le i \le n, \\ (K)_{l,l} = c = const. & 1 \le l \le n+1. \end{cases}$$

As the position of the target is unknown, the (N×N) matrix G consisting of the Euclidean scalar products of the set $\{s_1^{(t)}, s2^{(t)}, \ldots, s_n^{(t)}, x_t\}$ has unknown entries corresponding to the scalar products between the sensors with known positions and the target with an unknown position. The objective of the matrix completion consists of estimating the missing entries of the matrix G by exploiting a form of correlation with the complete matrix K. By partitioning the matrix G into 4 blocks $G_{tt}, G_{tp}, G_{pt}$ and $G_{pp}$ corresponding respectively to the sensor/sensor, sensor/target, target/sensor and target/target scalar products, the problem of matrix completion can be illustrated by the following diagram:

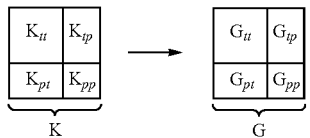

where the objective is the prediction of the unknown blocks (in gray) $G_{tp}, G_{pt}$ and $G_{pp}$ by estimating a relation between the (known) blocks $K_{tt}$ and $G_{tt}$. Note that in our location problem (following or tracking), only the $G_{tp}$ block interests us because it contains the scalar products between the sensors and the target:

$$G_{tp}=[(s_1^{(t)})^T x_t, \ldots, (s_i^{(t)})^T x_t, \ldots, (s_n^{(t)})^T x_t]^T,$$

It is worth noting that the matrix $G_{tp}$ is linear with respect to the unknown position $x_t$ of the target (X). This property will be employed in an effective implementation of the variational filter in the description hereafter.

In order to resolve the problem of matrix completion, the regression algorithm (AR) uses a matrix regression method based essentially on the formulation of the problem in the RKHS space. In the present invention, instead of predicting the missing block $G_{tp}$, it is proposed to calculate a probability distribution (DP) of $G_{tp}$. It can be shown that the relation between the blocks of the complete matrix K and the blocks of the incomplete matrix G is written as follows:

$$G_{tt}=K_{tt}AK_{tt}+\Psi_{tt}$$

$$G_{tp}=K_{tt}AK_{tp}+\Psi_{tp}$$

$$G_{pp}=K_{pt}AK_{tp}+\Psi_{pp}$$

where A is an unknown matrix and $\Psi=(\epsilon_{i,j})_{i,j=1 \ldots N}$ is a (N×N) matrix of Gaussian variables (i.i.d) having the same variance $\sigma_{ij}^2=\sigma^2$.

According to the statistical formulation above of the regression problem, it can be shown that, knowing the matrices $G_{tt}, K_{tt}$ and $K_{tp}$, the matrix $G_{tp}$ is random Gaussian the mean and covariance of which are given by the following expressions:

$$\begin{cases} \mu_g = G_{tt}K_{tt}^{-1}K_{tp} \\ \Sigma_g = \sigma^2(K_{pt}K_{tt}^{-2}K_{tp}+1)I_n \end{cases}$$

where $I_n$ is the (n×n) identity matrix.

The Gaussian distribution of the vector $G_{tp}$ in the present invention is particularly advantageous because its use as a confidence function in the variational filter described hereafter, or in facilitating (hastening) the calculation.

In fact, denoting by $S=[s_1^{(t)}, s_2^{(t)}, \ldots, s_n^{(t)}]^T$ the (n×2) matrix of the positions of the sensors selected at the instant t, the Gaussian aspect of $G_{tp}$ can be expressed by the following relation:

$$G_{tp}=Sx_t=G_{tt}K_{tt}^{-1}K_{tp}+\gamma_t$$

where $\gamma_t$ is a Gaussian noise with zero mean and with diagonal covariance matrix $\Sigma_g$ defined by the foregoing expressions of the mean and the covariance of the random Gaussian matrix $G_{tp}$. The expression of the Gaussian aspect of $G_{tp}$ above can be considered as the resulting statistical model relating the observed data and the positions of the objects to be located (and tracked) (passive targets or mobile sensors). This model will play the role of the confidence function when the Bayesian (variational) filtering method is implemented in the tracking step (55) described hereafter. The quantity $G_{tt}K_{tp}^{-1}K_{tp}$ in the term on the right side of the equation above can be interpreted as the sufficient statistic summarizing all the data available at the current instant t.

It is therefore understood that the matrix regression algorithm (AR) makes it possible, for example via the calculations described here, to obtain a probability distribution (DP) of the target (X). In particular, when the regression algorithms allows the implementation of the calculations detailed here, it is understood that in these embodiments of the invention the probability distribution (DP) of the position of the target (X) in the region (Z) is a Gaussian. It is recalled that this Gaussian expression is particularly advantageous for its use in the variational filter hereafter.

Once the calculation of the probability distribution (DP) of the target (X) is allowed by this matrix regression, it is possible to carry out tracking of a mobile target by implementing at least one tracking algorithm within the network of sensors (in the processing means (S1)) for carrying out variational filtering.

The term variational filtering is used here because Bayesian filtering method always has the purpose of calculating the probability of an unknown (here the position of the target) based on knowledge of the data. Here, the variational filtering algorithm (AF) is based on a variational calculation in which differentiation by a function is performed because a criterion is available that depends on a function (and not on a vector) and the function that allows that criterion to be minimized is being sought.

Following the location of the target thanks to the regression above, to allow tracking of the target if it is mobile, the method can then comprise, in certain embodiments, an iteration, at each instant (t), of a step consisting of tracking (55) of the target (X) by the leader sensor (SL) by updating (551) the position of the target (X) using at least one variational filtering algorithm (AF) based on a variational filter providing an estimate of the position of the target (X).

In certain embodiments of the invention, the variational filter used during the updating step (551) relies on the use of a confidence function of the position of the target (X) based on the probability distribution (DP) of the position of the target (X) determined during the determination step (54), and on the use of a model (MT), called a transition model, relying in particular on a temporal correlation of an assumed trajectory (T) of the target (X) from one instant to another. In addition, the tracking step (55) comprises, at each instant (t), an iteration of a step (552) consisting of predicting the position(s) of the target(s) at the following instant.

In the variational filtering algorithm (AF), the confidence function will be based on the Gaussian linear model Gtp obtained by the matrix regression method described previously. The dynamics of the state of the system $x_t$ is described by a model consisting of a continuous mixture of Gaussians (mean-scale mixture).

According to this model, the hidden state $x_t \in \mathbb{R}^{n_x}$ follows a Gaussian distribution with random mean $\mu_t$ and accuracy matrix $\lambda_t$. The mean follows a Gaussian random walk, expressing the temporal correlation of the trajectory of the hidden state of the system. The accuracy matrix follows Wishart's law:

$$\begin{cases} \mu_t \sim \mathcal{N}(\mu_t|\mu_{t-1}, \bar{\lambda}) \\ \lambda_t \sim \mathcal{W}_{\bar{n}}(\lambda_t|\bar{S}) \\ x_t \sim \mathcal{N}(x_t|\mu_t, \lambda_t) \end{cases}$$

where the hyperparameters $\bar{\lambda}$, $\bar{n}$ and $\bar{s}$ are respectively the accuracy matrix of the random walk, the degree of freedom and the accuracy matrix of the Wishart distribution.

It will be noted that the expression above corresponds to a model (MT) called a transition model, giving an a priori on the trajectory of the target. What is more, the confidence function of the position of the target (X) is based on the probability distribution (DP) of the position of the target (X), determined during the determination step (54), and the filter therefore makes it possible to fuse the confidence function with the transition model.

It is worth noting that the random aspect of the mean and of the accuracy matrix results in a marginal a prior distribution the behavior of the tails whereof can be adjusted simply according to the values of the hyperparameter. Moreover, a heavy-tailed distribution allows effective tracking of trajectories having sudden jumps.

According to the transition model (MT), the augmented hidden state becomes $(x_t, \mu_t, \lambda_t)$. Instead of approximating the filtering distribution $p(\alpha_t|y_{1\ldots t})$ by a set of weighted particles as in the particle filtering known from the prior art, the principle of the in-line variational approach consists of approximating this distribution by another, simpler functional $q(\alpha_t)$ by minimizing the Kullback-Leibler divergence with respect to the true filtering distribution:

$$D_{KL}(q\|p) = \int q(\alpha_t) \log \frac{q(\alpha_t)}{p(\alpha_t|y_{1\ldots t})} d\alpha_t$$

The above minimization of the Kullback-Leibler divergence with the tools of variational calculation and by imposing a separable (non-parametric) form $q(\alpha_t)=q(x_t)q(\mu_t)q(\lambda_t)$ the following iterative procedure is obtained:

$$\begin{cases} q(x_t) \propto \exp\langle \log p(y_{1\ldots t}, \alpha_t)\rangle_{q(\mu_t)q(\lambda_t)} \propto \mathcal{N}(x_t|x_t^*, \Gamma_t^*) \\ q(\mu_t) \propto \exp\langle \log p(y_{1\ldots t}, \alpha_t)\rangle_{q(x_t)q(\lambda_t)} \propto \mathcal{N}(\mu_t|\mu_t^*, \lambda_t^*) \\ q(\lambda_t) \propto \exp\langle \log p(y_{1\ldots t}, \alpha_t)\rangle_{q(x_t)q(\mu_t)} \propto \mathcal{W}_{n^*}(\lambda_t|S_t^*) \end{cases}$$

where the parameters are updated iteratively according to the following scheme:

$x_t^* = \Gamma_t^{*-1}(S^T \Sigma_g^{-1} G_{tt} K_{tt}^{-1} K_{tp} + \langle \lambda_t \rangle \langle \mu_t \rangle)$ $\Gamma_t^* = S^T \Sigma_g^{-1} S + \langle \lambda_t \rangle$ $\mu_t^* = \lambda_t^{*-1}(\langle \lambda_t \rangle \langle x_t \rangle + \lambda_t^P \mu_t^P)$ $\lambda_t^* = \langle \lambda_t \rangle + \lambda_t^P$ $n^* = \bar{n} + 1$ $S_t^* = (\langle x_t x_t^T \rangle - \langle x_t \rangle \langle \mu_t \rangle^T - \langle \mu_t \rangle \langle x_t \rangle^T + \langle \mu_t \mu_t^T \rangle + \overline{S^{-1}})^{-1}$ $\mu_t^P = \mu_{t-1}^*$ $\lambda_t^P = (\lambda_{t-1}^{*-1} + \bar{\lambda}^{-1})^{-1}$ Let us note that all the variables have confidence factors that are simple to calculate:

$$\begin{cases} \langle x_t \rangle = x_t^*, \langle x_t x_t^T \rangle = \Gamma_t^{*-1} + x_t^* x_t^{*T}, \\ \langle \mu_t \rangle = \mu_t^*, \langle \mu_t \mu_t^T \rangle = \lambda_t^{*-1} + \mu_t^* \mu_t^{*T}, \\ \langle \lambda_t \rangle = n * S_t^* \end{cases}$$

It will be noted that for a confidence function having the general form $p(y_t|x_t)$, the position of the target does not have a simple analytical distribution $q(x_t)$. For calculating its mean and its covariance, it will be necessary to proceed by Monte Carlo simulations as in the prior art.

In the variational filtering algorithm (AF), however, thanks to the linear and Gaussian form of the confidence, the mean and the covariance of $x_t$ are calculated exactly, resulting in a rapid implementation of the variational algorithm.

It is worth noting that the calculation of $q(\alpha_t)$ is implemented in a sequential manner (in time) solely on the basis of knowledge of $q(\mu_{t-1})$. Indeed, in taking into account the separable form of the distribution at the previous instant t−1, the filtering distribution is written:

$$p(\alpha_t|y_{1:t}) \propto p(y_t|x_t)p(x_t,\lambda_t|\mu_t)\int p(\mu_t|\mu_{t-1})q(\alpha_{t-1})d\alpha_{t-1} \propto p(y_t|x_t)p(x_t,\lambda_t|\mu_t)\int p(\mu_t|\mu_{t-1})q(\mu_{t-1})d\mu_{t-1}$$

where only the integration with respect to $\mu_{t-1}$ is employed thanks to the separable form of $q(\alpha_{t+1})$. Here the basis is the temporal correlation (auto-correlation) of the trajectory using the probability of the target's position at the previous instant. The temporal dependence is limited in the present invention to the functional of a single component. In a decentralized context, communication between 2 units assigned to update the filtering distribution is found to be limited to sending $q(\mu_{t-1})$ which thus represents the sufficient statistic (SS). This $q(\mu_{t-1})$ represents knowledge of the trajectory at the previous instant. It will be noted that in the case of particle filtering, this knowledge requires a plurality of particles (and hence a large quantity of data). What is more, a simple calculation makes it possible to show that this functional is a Gaussian and therefore that communication between two successive leader nodes is limited to the sending of a mean and of a covariance. Thus, the conventional particle approach consisting of first updating the probability densities and later approximating them is no longer necessary. This joint processing of the data and of the approximation of the sufficient statistics is particularly advantageous in terms of effectiveness and speed.

It is therefore understood that for each iteration, data (SS) are obtained that represent the sufficient statistics which allow updating of the variational filter at the following instant (from t−1 to t or from t to t+1). Advantageously, these data are representative of a mean and a covariance of the estimated position of the target (X).

The sake of clarity, the target tracking protocols and the protocols for locating mobile sensors are presented separately in what follows.

Passive Targets

Figure 2:
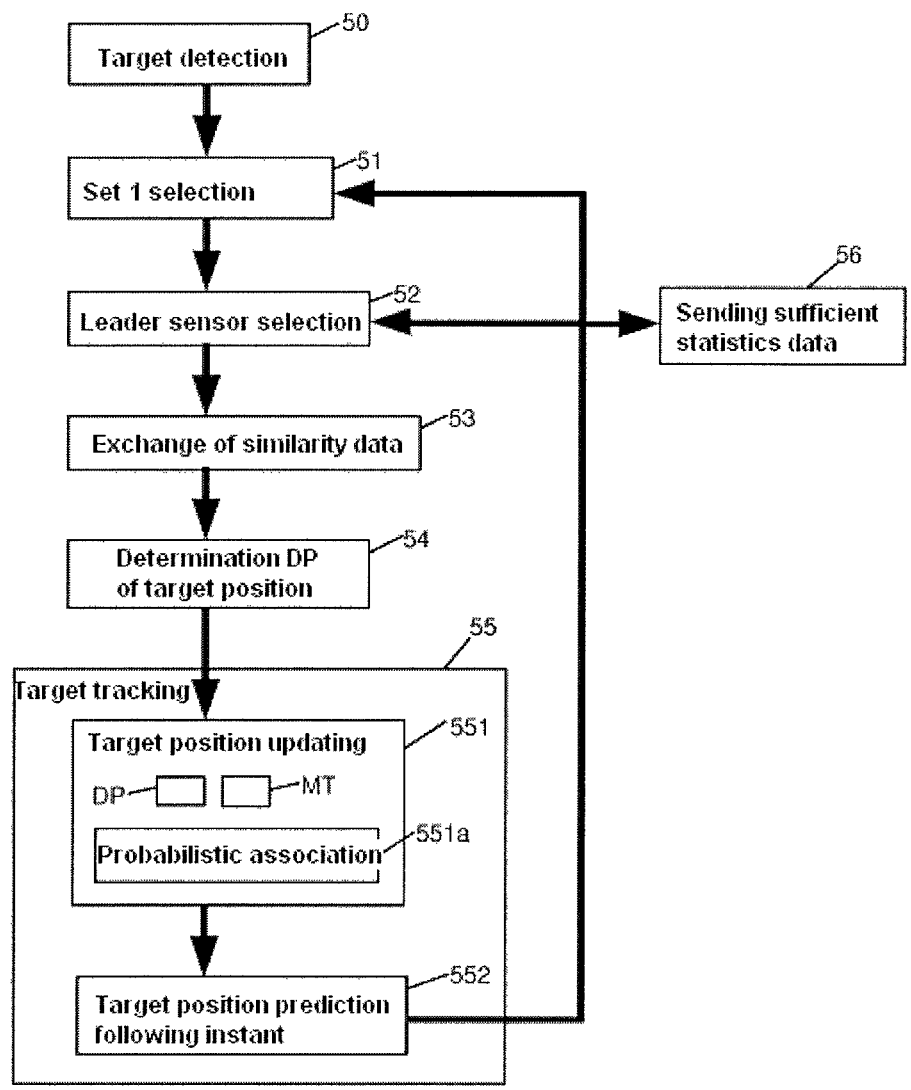
FIG. 2 shows an embodiment of the location method according to the invention, implemented in the case of passive targets.

One embodiment of the method according to the invention, representative of a global passive target tracking protocol, is shown in FIG. 2.

As mentioned previously, the method comprises, when the target(s) (X) is (are) a passive target or targets with respect to the signals of the sensors (S), a step consisting of detecting (50) at least one target (X) present in the region (Z), by at least one of the sensors (S) at an initial instant. In addition, the method comprises, at each instant (t), an iteration of a step of selecting (51) a set (I) of sensors (S), using at least one activation algorithm (AA), prior to the step of selection (52) of the leader sensor (SL), the latter then be selected from within this set (I) using the selection algorithm (AS).

Moreover, in certain embodiments, when there exist several targets and they are passive, the leader sensor (SL) of each target (X) implements, during the updating step (551), a step consisting of probabilistic data association (551a), said data representing the position of the target (X) and its trajectory (T), emanating from the variational filter used by that leader sensor (SL), for determining to which target (X) a set of data corresponds. Indeed, the in the case of several targets, it is possible to use one variational filter per target. However, the sensors have no information relating which target the filter corresponds to. Probabilities regarding the correspondence between the filter data and the target therefore allow determination of which filter (X) a set of data from a filter corresponds to.

In addition, during the variational filtering, the step of prediction (552) of the position(s) of the target(s) at the following instant is accompanied, when the target(s) is (are) a passive target or targets with respect to the signals of the sensors (S), by a reiteration of the step of selecting (51) a set (I) of n sensors (S), using at least one activation algorithm (AA), and of the step of selecting (52) a leader sensor (SL) using the selection algorithm (AS). Thus are selected, using the predicted trajectory, the sensors which will be relevant for continuing tracking of the target.

Finally, the step of predicting (552) the position(s) of the target(s) at the following instant is followed, when the target(s) is(are) a passive target or targets with respect to the signals of the sensors (S), by a step consisting of sending (56) by the leader sensor (SL) at the instant (t) to the leader sensor of the following instant, data (SS) representative of sufficient statistics for updating the variational filter in the following instant and a reiteration of the method. As mentioned previously, these data can advantageously be representative of a mean and a covariance of the estimated position of the target (X).

Mobile Sensors

It will be noted that the present invention is particularly suited to mobile sensors of the "manet" type (mobile ad hoc networks).

Unlike the passive target case, the location procedure is implemented by the mobile sensors themselves. Consequently, location no longer necessitates certain steps such as the probabilistic association of data or the sending of sufficient statistics.

Figure 3:
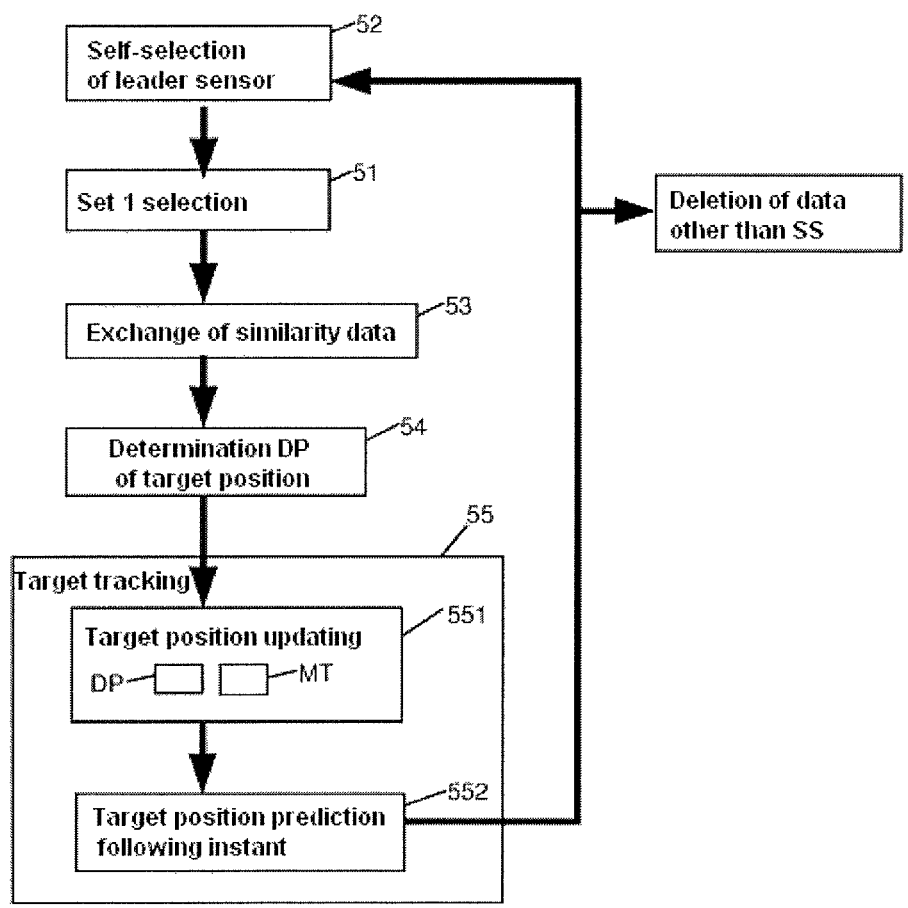
FIG. 3 shows an embodiment of the location method according to the invention, implemented in the case of (a) target mobile sensor(s)

One embodiment of the method according to the invention, representative of a protocol implemented for targets consisting of mobile sensors, is represented in FIG. 3.

It will be noted here that the case where the target is a single mobile sensor and the case where the targets are several mobile sensors are processed with exactly the same algorithm, as they are automatically defined as leader sensors for their own tracking, the other sensors with known position (the anchors) allowing geographic location within the region (Z). As mentioned previously, when the target(s) is (are) a mobile sensor or sensors, it is (they are) selected, thanks to the selection algorithm (AS) as leader sensor(s). The mobile sensor selects itself as leader sensor for estimating its own position and it selects, using at least one activation algorithm (AA) a set (I) of n neighboring sensors (S) for estimating its position within the region (Z).

The mobile sensor therefore exchanges similarity data here with anchor sensors (having known positions) around it to carry out the regression explained previously. In thus makes use of anchor/anchor, sensor/anchor and sensor-sensor similarity data (DS). Indeed, in the case of 2 target mobile sensors, the latter can also exchange similarity data (DS), as illustrated in FIG. 4B (two-way arrows between the 2 target mobile sensors (X) represented by black dots) and can exchange similarity data with the other fixed sensors (S) of the network (anchors having known locations) as illustrate in FIG. 4B (two-way arrows between the 2 target mobile sensors (X) represented by black dots and the sensors (S) of the selected set (I) represented by shaded dots, the white dots representing the sensors that have not been selected in the set). However, in the case of passive targets, only the sensors (S) exchange similarity data (DS) with one another, as illustrated in FIG. 4A (two-way arrows between the sensors (S) of the selected set (I) represented by shaded dots) and sense the target (one-way arrows between the targets (X) and the sensors (S) of the selected set (I) represented by shaded dots).

Figure 4A:
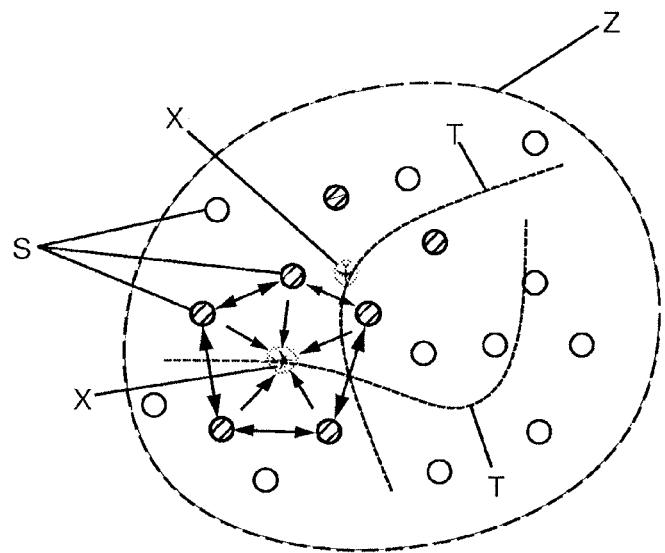
FIGS. 4A and 4B show an embodiment of the location method according to the invention, with data exchanges in the case of, respectively, 2 passive targets and 2 target mobile sensors.
Figure 4B:
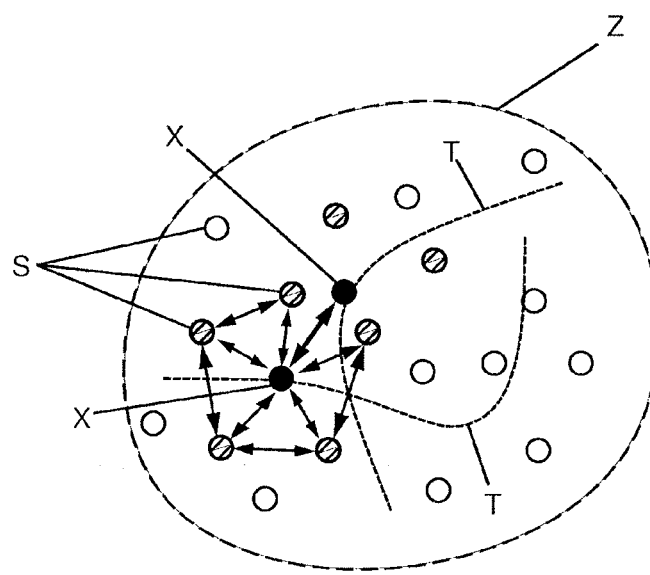

It will be noted that FIGS. 4A and 4B illustrate the fact that in the case of target mobile sensors, in FIG. 4B, the latter exchange similarity data and there is therefore no need to make a probabilistic association in order to know to which target a set of data belongs, while in the case of passive targets (an airplane, by way of a non-limiting example) in FIG. 4A, it is necessary to distinguish the 2 targets (with their trajectories shown in dotted lines), by using the probabilistic association described previously. Moreover, the step of predicting (552) the position(s) of the target(s) at the following instant is followed, when the target(s) is(are) a mobile sensor or sensors, by a step consisting of deleting the data processed by the processing means (S1) of the leader sensor, with the exception of the data (SS) representative of sufficient statistics for updating the variation filter of this leader sensor (SL) in the following instant, followed by a reiteration of the method.

It is therefore understood that the present invention contributes an effective solution to the problem of inaccuracy/lack of knowledge/variation of the observation model (of sensor operation). In fact, the invention makes it possible to dispense with knowledge of the model by using its similarity data between the active sensors having known positions. These supplementary data make it possible to locally learn the model by using the principle of matrix regression. What is more, the result of this training leads to a linear Gaussian confidence model allowing effective implementation of the variational filter (or of the Kalman filter). The equations obtained can be interpreted as a generalized version of the Kalman filter with a random state covariance matrix. The Bayesian filtering method also allows calculation of the predictive distribution of the position of the target. This distribution is used to design a protocol for activating the most relevant sensors for tracking the target in a completely distributed framework. These functionalities of the present invention provide many advantages such as speed of computation for location and tracking, low power consumption and small quantity of information exchanged, resistance to variations in the sensors, etc.

Several functional aspects described in the present description are designated as being supported by "processing means" employing algorithms. It will be understood, particularly upon reading the present application, that the components of the present invention, as generally described and illustrated in the figures, can be arranged and designed according to a great variety of different configurations. Thus, the description of the present invention and different figures are not intended to limit the scope of the invention, but simply represent selected embodiments. For example, the processing means can include computer resources and/or at least one electronic circuit, such as an integrated circuit for example, and/or other types of arrangements of components, such as for example semiconductors, logic gates, transistors, a processor or processors, or other discrete components. Such processing means can also comprise one or more software application(s) or portion(s) of code executable within at least one software environment for the implementation of the functionalities described here. The functionalities are described with reference to algorithms to illustrate that the processing means will employ function means which correspond to processing algorithms, and can in fact be implemented in the form of executable code instructions for example. For example, the sensors can include memory means storing at least data representative of the algorithms but it is obvious that the sensors can be equipped with communication means, the data set needed for the implementation of the invention is not necessarily stored in the sensors and can be present only in volatile form and that the processing means can use data representing algorithms or results of processing based on those algorithms, coming from an outside source, although the present invention actually makes it possible to not require this type of arrangement as it reduces cost in terms of data processing and communication, which makes it particularly suited to networks of isolated sensors having energy resources that are limited and non-renewable or poorly renewable.

In addition, one or more physical or logical blocks of machine instruction can, for example, be organized into an object, a process or a function. What is more, the routines and instructions used by these processing methods do not need to be physically located together, but can consist of disparate instructions stored in different places which, once functionally and logically united, form the algorithm implemented by the processing means such as described here, for accomplishing the function indicated for the algorithm. A single executable code instruction can in fact be distributed among several different segments of code or among different programs and stored in several blocks of memory. Likewise, operational data can be identified and illustrated in the processing means and can be incorporated in an appropriate form and be organized into any appropriate type of data structure. The operational data can be collected or can be distributed over different places including different finite storage devices and can exist, at least partially, simply as electronic signals on a system or on a network. Here the device is designated as including processing means in certain embodiments, but the person skilled in the art will understand that it can in fact be associated with such means or include them in its structure. The device includes data processing means allowing the implementation of the functions described and can therefore generally include (or be associated with) specific circuits implementing these functions or computer resources allowing the execution of instructions fulfilling the functions previously described. The person skilled in the art will understand that numerous variations in implementation are possible.

However, the invention can be advantageously implemented in a network of sensors having limited resources and therefore limited production costs, thanks to the speed and the simplification allowed by the algorithms described here.

Finally, the equations detailed here are a form of expression particularly suited to the implementation of the invention, but the person skilled in the art will understand the possible adaptations of the mathematical formulation for obtaining the same functions and advantages as those described here for the algorithms.

Generally, it must be clear to the person skilled in the art that the present invention allows embodiments in numerous other specific forms without departing from the field of application of the invention as claimed. Consequently, the present embodiments must be considered by way of illustration, but can be modified within the field defined by the scope of the appended claims, and the invention must not be limited to the details given above.

The invention claimed is:

1. A method for locating and/or tracking at least one target with a network of transmitter/receivers, called sensors, of which at least part have a known geographic location, each comprising data processing means implementing at least one algorithm for locating and/or tracking target(s), means for transmitting/receiving a signal that decreases with distance and communication means, the network of sensors covering at least one geographic area, called the region, the method comprises, for each instant (t), an iteration of the following steps:

selection of a sensor, called the leader, for each target, using at least one leader selection algorithm, for the implementation of the subsequent steps, exchange of data, called similarity data, between the leader sensor and at least part of the sensors in the network, these data being representative of power measurements of the signal between the sensors and the target and between the sensors themselves, determination of a probability distribution of the position of the target in the region by the leader sensor, using at least one probabilistic matrix regression algorithm, determining, on the basis of the similarity data, a probability distribution of the scalar products between the positions of the sensors and the positions of the target, for estimating said probability distribution of the position of the target.

2. A method according to claim 1, the method further comprises, when the target(s) is (or are) a passive target or targets with respect to the signals of the sensors, a step of detection of at least one target present in the region, by at least one of the sensors at an initial instant, and further comprises, at each instant (t) an iteration of a step of selection of a set of n sensors, using at least one activation algorithm, prior to the step of selection of the leader sensor, the latter being then selected from within this set using the selection algorithm.

3. A method according to claim 1, wherein when the target(s) is (or are) a mobile sensor or sensors, this (or these) mobile sensor or sensors is (or are) selected using the selection algorithm, as leader sensor(s) and select(s), using at least one activation algorithm, a set of n neighboring sensors for estimating the position of the target within the region.

4. A method according to claim 1, the method further comprises, at each instant (t), an iteration of a step of tracking of the target by the leader sensor, by updating the position of the target using at least one variational filtering algorithm based on a variational filter providing an estimate of the position of the target.

5. A method according to claim 4, wherein the variational filter used during the updating step relies on the use of a confidence function of the position of the target based on the probability distribution of the position of the target determined during the determination step, and on the use of a model, called a transition model, based in particular on a temporal correlation of an assumed trajectory of the target from one instant to another.

6. A method according to claim 4, wherein, when there exist several targets and the targets are passive, the leader sensor of each of the targets employs, during the updating step, a step of probabilistic association of the data representative of the position of the target and of its trajectory, emanating from the variational filter used by this leader sensor, for determining to which target a set of data belongs.

7. A method according to claim 4, wherein the tracking step comprises, at each instant (t), an iteration of a step of predicting the position(s) of the target(s) at the following instant.

8. A method according to claim 7, wherein the step of predicting the position(s) of the target(s) at the following instant is accompanied, when the target(s) is (are) a passive target or targets with respect to the signal of the sensors, of a reiteration of the step of selecting a set of n sensors, using at least one activation algorithm and of the step of selecting a leader sensor using the selection algorithm.

9. A method according to claim 7, wherein the step of predicting the position(s) of the target(s) at the following instant is followed, when the target(s) is (are) a passive target or targets with respect to the signal of the sensors, by a step of sending, by the leader sensor at the instant (t) to the sensor leader of the following instant, of data representative of sufficient statistics for updating the variational filter at the following instant and a reiteration of the method.

10. A method according to claim 7, wherein the step of predicting the position(s) of the target(s) at the following instant is followed, when the target(s) is (are) a mobile sensor or sensors, by a step of erasing the data processed by the processing means of the leader sensor, with the exception of the data representative of sufficient statistics for updating the variational filter of that leader sensor in the following instant, followed by a reiteration of the method.

11. A method according to claim 1, wherein the similarity data are considered to be Euclidean scalar products between the sensors and the target and between the sensors themselves, in a reproducing Kernel Hilbert space.

12. A method according to claim 1, wherein the probability distribution of the position of the target within the region is a Gaussian.

13. A method according to claim 9, wherein the data representative of sufficient statistics are representative of a mean and a covariance of the estimated position of the target.

14. A system for locating and/or tracking at least one target with a network of transmitter/receivers, called sensors, of which at least part have a known geographic location, each comprising data processing means, means for transmitting/receiving a signal that decreases with distance and communication means, the network of sensors covering at least one geographic area, called the region, wherein the data processing means implement at least one algorithm for locating and/or tracking target(s) by the implementation of the method according to claim 1.

15. A system according to claim 14, wherein the means for transmitting/receiving a signal that decreases with distance and communication means are the same means, allowing both measurements and communication for the implementation of said method.

* * * * *